(12) United States Patent
Hariharan

(10) Patent No.: US 8,766,557 B2
(45) Date of Patent: Jul. 1, 2014

(54) ELECTRONIC TRANSFORMER COMPATIBILITY FOR LIGHT EMITTING DIODE SYSTEMS

(75) Inventor: Suresh Hariharan, Livermore, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 176 days.

(21) Appl. No.: 13/290,411

(22) Filed: Nov. 7, 2011

(65) Prior Publication Data
US 2012/0112648 A1 May 10, 2012

Related U.S. Application Data

(60) Provisional application No. 61/411,362, filed on Nov. 8, 2010.

(51) Int. Cl.
*H05B 37/02* (2006.01)

(52) U.S. Cl.
USPC .................... 315/297; 315/225; 315/307

(58) Field of Classification Search
USPC .......... 315/209 R, 227 R, 246, 247, 283, 291, 315/307, 308, 360
See application file for complete search history.

(56) References Cited

U.S. PATENT DOCUMENTS

| | | | |
|---|---|---|---|
| 6,380,693 B1* | 4/2002 | Kastl | 315/209 R |
| 2007/0024213 A1* | 2/2007 | Shteynberg et al. | 315/291 |
| 2008/0180036 A1* | 7/2008 | Garrity et al. | 315/227 R |
| 2008/0278092 A1* | 11/2008 | Lys et al. | 315/247 |
| 2009/0167202 A1* | 7/2009 | Miskin et al. | 315/250 |
| 2010/0213859 A1* | 8/2010 | Shteynberg et al. | 315/224 |

* cited by examiner

*Primary Examiner* — Alexander H Taningco
*Assistant Examiner* — Christopher Lo
(74) *Attorney, Agent, or Firm* — North Weber & Baugh LLP

(57) ABSTRACT

Various embodiments of the invention provide power factor correction in solid state lighting applications. In certain embodiments, an LED driver for an LED array is controlled for power factor correction by a control circuit block. The control circuit block comprises electronic circuitry that enables the input current to the LED driver to be measured and controlled. This control circuit block comprises at least one switching device that enables an alternating form of current at a particular frequency to be applied to the LED array regardless of whether the main power source is a DC or AC power source.

20 Claims, 8 Drawing Sheets

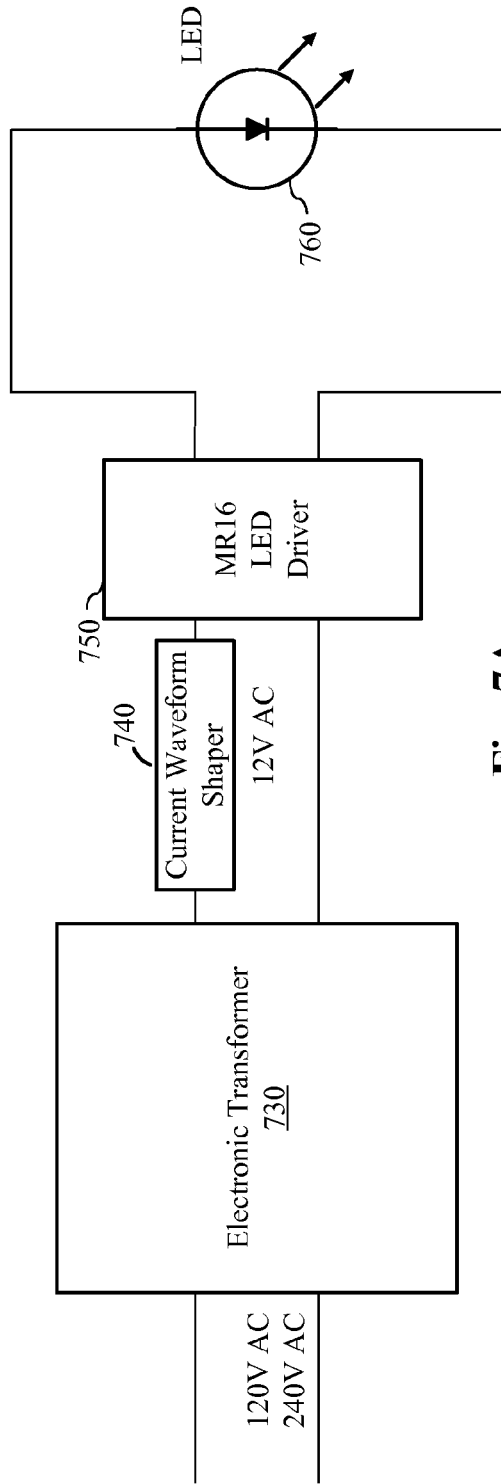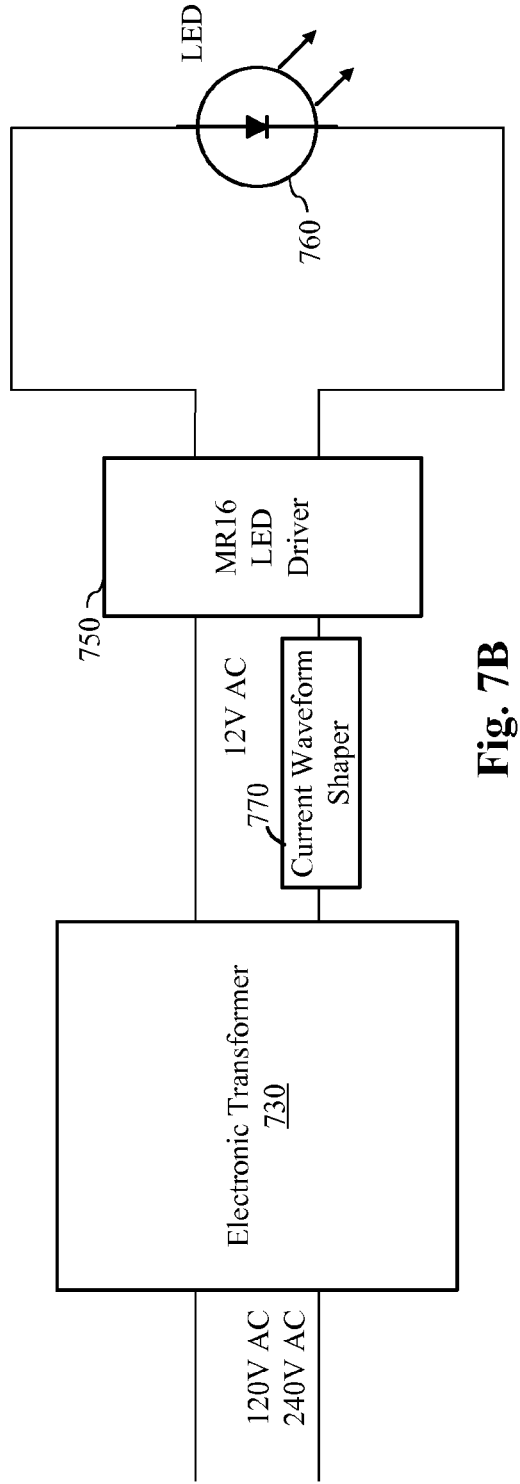
Fig. 7A
Fig. 7B

ELECTRONIC TRANSFORMER COMPATIBILITY FOR LIGHT EMITTING DIODE SYSTEMS

CROSS REFERENCE TO RELATED PATENT APPLICATIONS

This application claims priority to U.S. provisional application Ser. No. 61/411,362, entitled "Electronic Transformer Compatibility for Light Emitting Diode Systems," filed Nov. 8, 2010, which application is incorporated herein by reference in its entirety.

BACKGROUND

1. Field of the Invention

The present invention relates to a control system for controlling currents in an electronic system. More particularly, the present invention relates to a control system for controlling the current in drivers for solid-state lighting (SSL) devices, such as, for example, a light emitting diode (LED) or an array or cluster of light emitting diodes (LEDs) having driver circuitry that is compatible with electronic transformers and supports dimming functionality. It also improves the compatibility of LED systems to certain types of electronic transformers by enhancing current flow through the transformer.

2. Background of the Invention

Solid-state lighting (SSL) refers to a type of lighting that utilizes light-emitting diodes (LEDs) as sources of illumination rather than electrical filaments or gas. There are several types of LEDs popularly used in solid-state lighting (SSL). The first type of LED, and the most commonly used type of LED, is the semiconductor LED. A semiconductor LED consists of a chip of semiconducting material impregnated or doped with impurities to create a p-n junction. Other types of LEDs suitable for SSL include organic LEDs or light emitting polymers (LEPs). In these LEDs, an emissive electroluminescent layer is composed of a film of organic compounds. The layer usually contains a polymer substance that allows suitable organic compounds to be deposited which are capable of producing light. As used herein, the term, "light emitting diode (LED)" includes any type of such solid state lighting device including semiconductor LEDs, organic LEDs or LEPs.

The benefits and wide-range applicability of LEDs in today's lighting systems are now realized and recognized by those skilled in the art. For many years, halogen-based lamps were the primary light source implemented within lighting systems. Over the past years as LED technology has developed, the advantages of LEDs over halogen lamps have become increasingly apparent. When compared to halogen lamps, LEDs are relatively smaller, and have a longer operating life. Another important difference between halogen bulbs and LEDs is the significantly less amount of power required by LEDs to operate. For example, a halogen lamp may operate within a range of 20-50 Watts and an LED at about 5-15 Watts.

The term "solid-state" refers to the fact that light in an LED is emitted from a solid object (e.g., a block of semiconductor or organic layers or materials) rather than from a vacuum or gas tube, as is the case in traditional incandescent light bulbs and fluorescent lamps. Unlike traditional lighting, SSL creates visible light with reduced heat generation or parasitic energy dissipation. In addition, its solid-state nature provides for greater resistance to shock, vibration, and wear, thereby increasing its lifespan significantly. The watts-per-lumen output of SSLs are also higher than incandescent light bulbs and fluorescent lamps. These advantages make SSLs particularly attractive for commercial and domestic lighting purposes, and are, therefore, increasingly replacing filament or gas-based lighting applications.

When LEDs are used for lighting applications, a cluster or an array of LEDs is used to achieve the requisite brightness and other desired lighting characteristics. Regardless of color, type, color, size or power, all LEDs work the best when driven with a constant current. LED manufacturers specify the characteristics (such as lumens, beam pattern, color) of their devices at a specified current value. One or more LED drivers are used to effectively control the electrical characteristics of the array of LEDs to suit the lighting. A LED driver is a self-contained power supply that has outputs matched to the electrical characteristics of the array of LEDs. Most LED drivers are designed to provide constant currents to operate the array of LEDs.

SSLs are powered in the same way as other lighting applications, namely, starting with and using an alternating current (AC) power source. Depending on the geographic location or application, the AC source could range between 110V and 240V. The frequency of these AC sources ranges between 50 Hertz and 60 Hertz. When AC power sources are used in SSLs, there is a need for power factor correction (PFC) to minimize losses in the AC power. PFC is the ratio between the actual load power and the apparent load drawn by an electrical load, e.g., the LED driver. PFC is a measure of how effectively the current is being converted into useful work output and, more particularly, is a good indicator of the effect of the load current on the efficiency of the power supply system.

In prior art approaches, LED drivers with PFC comprise at least two popular processing stages. The first stage is the power factor correction stage, which produces a regulated high voltage. The second stage includes a DC/DC/LED driver stage, which delivers a DC current to the array of LEDs. This approach requires a high value capacitor across the array of LEDs to effectuate the load delivery. Although this approach enables PFC in SSL, it has several disadvantages. These disadvantages include the use of higher number of total components to drive the LED driver, and a corresponding increase in cost of the LED driver circuitry. This approach also includes operational inefficiencies, as it requires the input AC source to be converted to DC before applications to the array of LEDs. Prior art approaches also require the LED current to be measured and monitored in order to achieve PFC, further contributing to the operational inefficiency.

Presently MR16 lamps use electronic transformers to supply the low voltage that is needed to operate these lamps. Typically, these MR16 lamps use halogen lamps that are purely resistive and draw about 20-50 watts of power. The electronic transformers are designed to operate with these halogen lamps and require a certain minimum power to operate properly. In transitioning MR16 LED systems, it is desirable to allow these LEDs to operate without having to substitute pre-existing electronic transformers.

The electrical characteristics of the electronic transformers require a certain amount of current within the transformer. If the current through the transformer falls below a threshold, the transformer will effectively turn off until current rises above the threshold. However, the amount of power drawn by an LED is significantly less than the amount drawn by a halogen lamp. As a result, the compatibility of MR16 LEDs to pre-existing electronic transformers is a significant design issue.

SUMMARY OF THE INVENTION

Various embodiments of the invention provide power factor correction in solid state lighting applications. In certain embodiments, an LED driver for an LED array is controlled for power factor correction by a control circuit block. The control circuit block comprises electronic circuitry that enables the input current to the LED driver to be measured and controlled. This control circuit block comprises at least one switching device that enables an alternating form of current at a particular frequency to be applied to the LED array regardless of whether the main power source is a DC or AC power source. A waveform shaper, such as an inductor, is positioned to modify an AC signal prior to being converted into a rectified DC signal. This waveform shaper improves the peak current on the AC power signal while maintaining its average current.

The LED driver does not measure any current in the LED array to regulate the solid state lighting application. Instead, the LED driver measures and controls the input current such that the input current to the LED driver is in phase with the current of the main power source in order to achieve PFC. Because the input current to the LED driver is in phase with the main power source, the LED driver appears as a resistive load across the main power source and results in PFC.

In some embodiments, the LED driver is an MR16 LED driver and incorporates a current waveform shaper at the positive or negative input of driver. In particular, the current waveform shaper is positioned between an electronic transformer and a bridge rectifier within the driver. The current waveform shaper effectively pulls an increased peak current every switching cycle of the transformer by modifying the waveform of the current received from the transformer. In certain embodiments, the current waveform shaper is an inductor that modifies a square wave current to a triangle wave current being drawn from the rectifier resulting in a relatively higher peak current.

BRIEF DESCRIPTION OF THE DRAWINGS

Reference will be made to embodiments of the invention, examples of aspects of which may be illustrated in the accompanying figures. These figures are intended to be illustrative, not limiting. Although the invention is generally described in the context of these embodiments, it should be understood that the scope of the invention is not limited to the particular embodiments thereof disclosed herein.

FIG. 7A is a general diagram showing a MR16 LED lighting system having a current waveform shaping element on a positive input of an MR16 LED driver according to various embodiments of the invention.

FIG. 7B is a general diagram showing a MR16 LED lighting system having a current waveform shaping element on a negative input of an MR16 LED driver according to various embodiments of the invention.

DETAILED DESCRIPTION OF THE INVENTION

In the following description, for the purpose of explanation, specific details are set forth in order to provide an understanding of the invention. It will be apparent, however, to one skilled in the art that the invention may be practiced without selected of these details. One skilled in the art will recognize that embodiments of the present invention, some of which are described below, may advantageously be incorporated into a number of different devices and systems. Structures and devices shown in block diagram are illustrative of exemplary embodiments of the invention and are included to avoid obscuring the invention. Furthermore, connections between components within the figures are not intended to be limited to direct connections. Rather, such connections between components may be modified, reconfigured, or otherwise changed by intermediary components.

Reference herein to "one embodiment" or "an embodiment" of the invention means that a particular feature, structure, characteristic, or function described in connection with the embodiment is included in at least one embodiment of the invention. The use of the phrase "in one embodiment" at various locations in the specification are not necessarily all references to a single embodiment of the invention.

Figure 1:
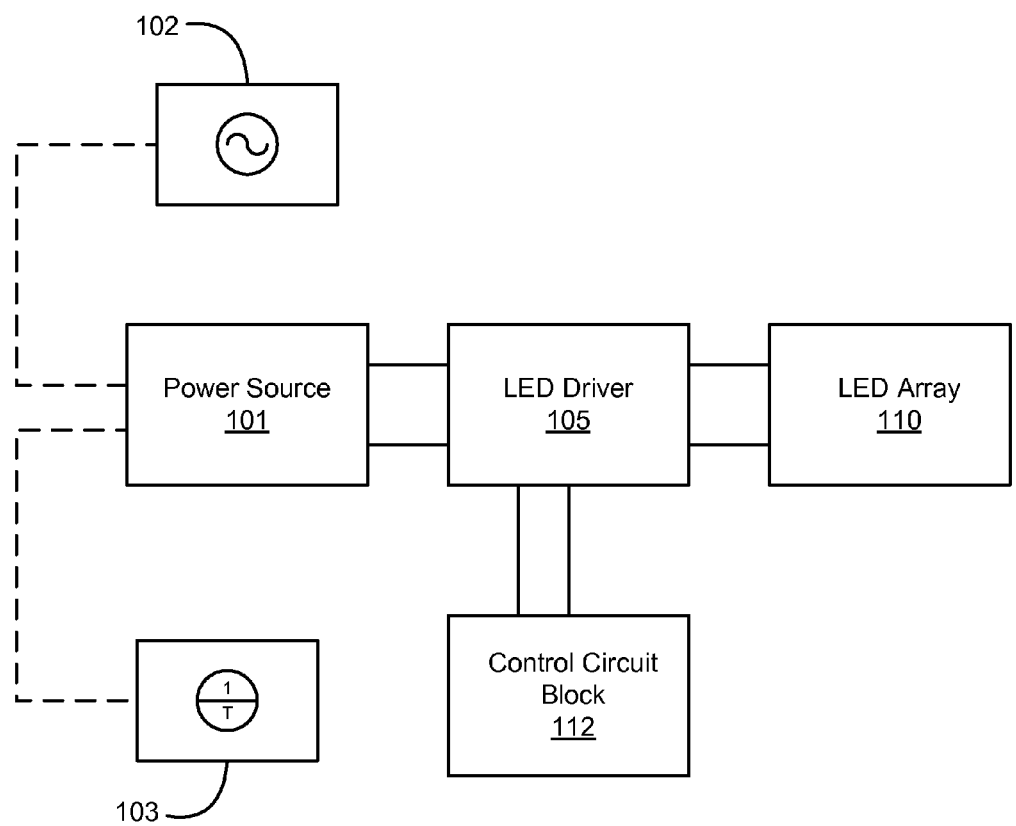
FIG. 1 illustrates an embodiment of an overall control system to implement power factor correction (PFC) in solid state lighting (SSL) applications.

FIG. 1 illustrates an embodiment of an overall control system to implement power factor correction (PFC) in solid state lighting (SSL) applications. In the case here, a main power source 101 provides power to an LED control system. In one embodiment, the main power source is a direct current (DC) power source 103, providing a DC current to power the control system. In another embodiment, the main power source is an alternating current (AC) power source 102, providing an AC current power the control system. One example is an AC current that has a sinusoidal waveform shape. Another example waveform is a square waveform. These power sources can be implemented through several means, each of which will be readily apparent to a person of skill in the art.

The power source 101 provides power to an LED driver 105, which is a driving mechanism to regulate the output of the LED array 110. There are several LED drivers that are available in the marketplace, which are readily apparent to those skilled in the art that can be employed in this embodiment. In the present embodiments, any LED driver that allows an input current to be programmed may be employed.

In one embodiment, the LED driver 105 for an LED array 110 is controlled for power factor correction (PFC) by a control circuit block 112. The driver circuit 105 receives power from the power source 101. The control circuit block 112 comprises electronic circuitry that enable the input current to the LED driver 105 to be measured and controlled. This control circuit block 112 comprises at least one switching device (not shown in FIG. 1) that enables an alternating form of current at a particular frequency to be applied to the LED array 110 regardless of whether the main power source 101 is a DC or AC power source. The functionality of the control circuit block 112 and the various components within the control circuit block 112 will be explained in further detail as it applies to additional embodiments discussed below.

The LED array 110 comprises the solid state lighting device. As the name suggests, the LED array 110 comprises an array or cluster of lighting emitting diodes (LEDs) arranged to provide the desired SSL structure. Examples of the LED devices include semiconductors LEDs, organic LEDs, polymer LEDs, etc. Other types of LEDs or other materials employed in SSL applications will be apparent to those skilled in the art, and any of these devices may be readily employed in the present invention.

In one embodiment shown in FIG. 1, the controlling block 112 is configured so as to enable the input current to the LED driver 105 to be measured and controlled. Contrary to prior approaches, the LED driver 105 does not measure any current in the LED array 110 to regulate the solid state lighting application. Instead, the LED driver 105 measures and controls the input current such that the input current to the LED driver 105 is in phase with the current of the main power course 101 in order to achieve PFC. Because the input current to the LED driver 105 is in phase with the main power source 101, the LED driver 105 appears as a resistive load across the main power source 101 and, thus, results in PFC.

In certain embodiments, the LED driver 105 is an MR16 LED driver and incorporates a current waveform shaper at the positive or negative input of driver 105. In particular, the current waveform shaper is positioned between an electronic transformer and a bridge rectifier within the driver 105. The current waveform shaper effectively pulls an increased peak current every switching cycle of the transformer by modifying the waveform of the current received from the transformer. In certain embodiments, the current waveform shaper is an inductor that modifies a square wave current to a triangle wave current being drawn from the rectifier resulting in a relatively higher peak current.

Figure 2:
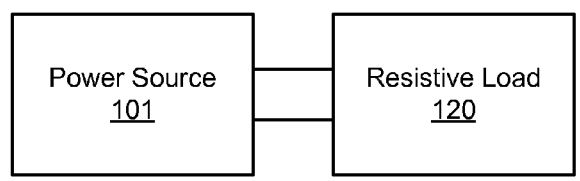
FIG. 2 is a block diagram illustrating an equivalent overall block diagram showing a resistive load.

FIG. 2 is a block diagram illustrating an equivalent circuit diagram to FIG. 1, after the input current to the LED driver 105 is measured and controlled to be in phase with the main power source 101. In the case here, LED driver 105, in equivalent, appears as a completely resistive load 120 across the main power source 101.

In addition to PFC, control circuit block 112 is configured such that the magnitude of current through LED array 110 can be controlled employing an external voltage. This external voltage may be regulated through control circuit block 112 or through the LED driver 105 or through any other means known to those skilled in the art.

Some examples of specific embodiments for realizing the control system are provided in greater detail below. It is noted that the arrangement of the components and the circuitry in each of the implementations is exemplary and provided for the purpose of explaining the embodiments illustrated in this disclosure. Those skilled in the art would be able to design other combinations or arrangements to achieve PFC by controlling the input current to an LED, i.e., by measuring and controlling the input current LED driver 105 such that the input current is in phase with the main power source 101, and such that the LED driver 105 appears as a resistive load 120 across the main power source 101.

Figure 3:
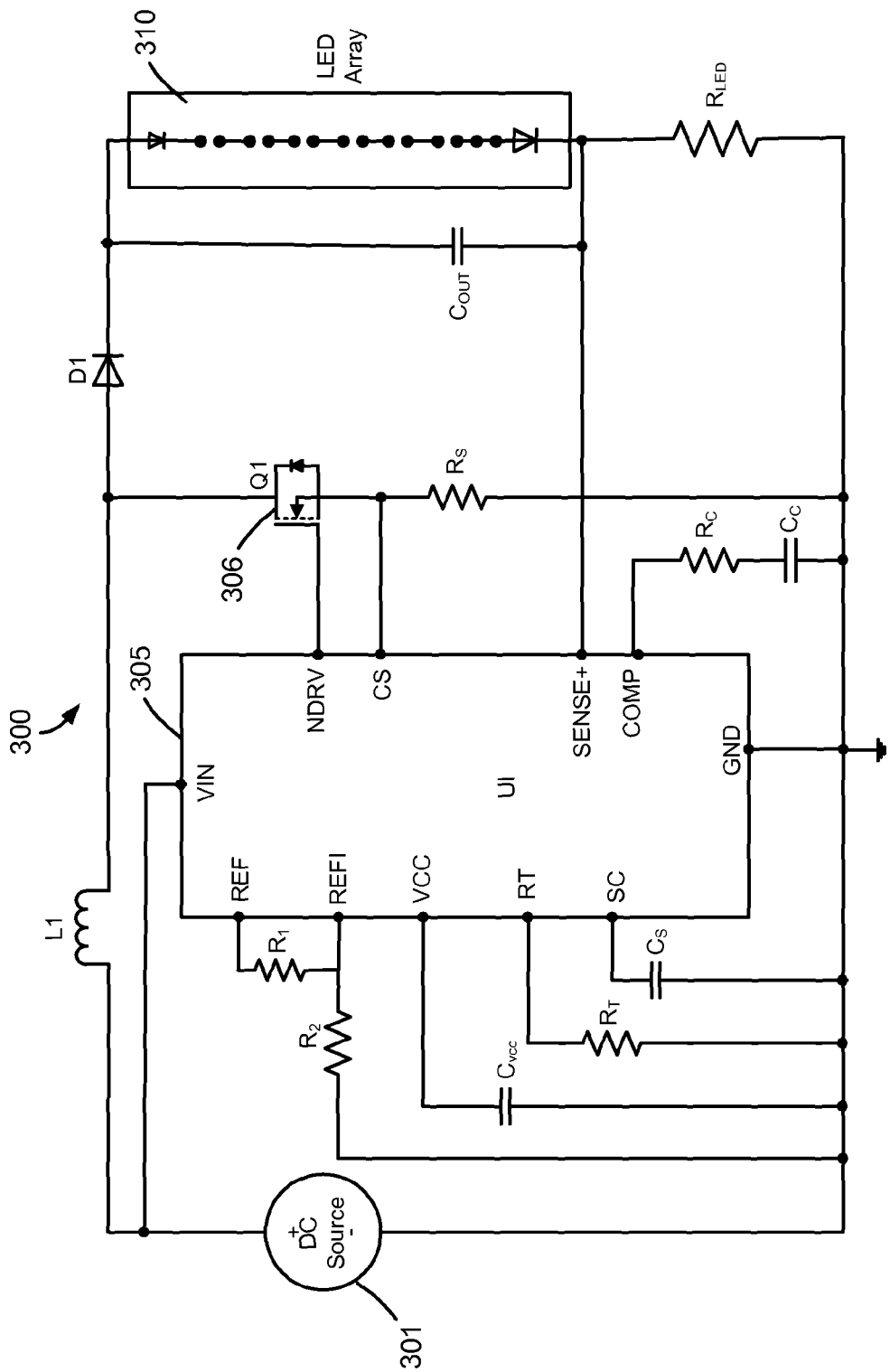
FIG. 3 provides the circuit diagram of an embodiment of present invention, where the circuit illustrates a simplified DC input boost LED driver employing a fixed frequency peak current mode control.

FIG. 3 illustrates a circuit 300 of one embodiment of the present invention where the circuit illustrates a simplified DC input boost LED driver that employs a fixed frequency peak current mode control (FFPCMC). This embodiment is an example of an LED driver that can be employed for DC input applications. The circuit 300 of FIG. 3 comprises a main power source 301 which is a DC power source. DC power source 301 provides power to an LED driver 305. The LED driver 305 is configured with a combination of input electronic components to control the input current to LED driver 305. In this embodiment, the LED driver 305 is employed for illustrative purposes. It should be understood that this particular LED driver may be replaced with any other LED driver that can provide programmable current to the LED load.

An NDRV pin on the LED driver 305 is connected to a switching device 306, which may, for example, be a MOSFET 306. A regulated voltage at VCC pin of LED drive 305 drives the switching frequency of Q1. This is, in turn, powered from the input voltage at the VIN pin of LED driver 305. The voltage across the resistor $R_S$ at the CS pin of LED driver 305 is used for a cycle by cycle current mode control function in LED driver 305. This sensed current signal is employed to control the switching of MOSFET Q1.

This embodiment explained in FIG. 3 illustrates the presence of two control loops. A first inner control loop, specifically, an inner peak current mode control loop, controls the duty cycle of switching MOSFET Q1. In some embodiments, compensation is internally added to the sensed current signal to avoid sub-harmonic oscillations in inner control loop. The magnitude of the slope compensation signal is controlled by the capacitor $C_S$ at the SC pin of driver 305. Additionally, the voltage across the resistor $R_{LED}$ is used to sense the LED current. This measured voltage appears at the SENSE+ pin of driver 305.

A second outer control loop, specifically, an outer LED current regulation loop, controls the input current to LED array 310. This outer loop employs an error amplifier to regulate the input current to the LED array 310. In one embodiment, the error amplifier may be, for example, a transconductance amplifier. Additionally, the compensation components $R_C$ and $C_C$ on the COMP pin are feedback compensation components to deliver a stable control loop.

In addition to the above controls, the magnitude of the input current to the LED array can be changed by controlling the voltage at the REFI programmable reference pin of LED driver 305. Therefore, in this embodiment where main power source 301 is a DC power, the regulation (measuring and controlling) of the input current to the LED array arrays, along with the current adjustability feature (by virtue of the REFI pin). Therefore, in this particular embodiment, the current that is controlled by LED driver 305 is not the current through the LED array or arrays, but the input current itself. Additionally, this embodiment enables the input current to LED array 310 to be proportional to the input voltage.

Figure 4:
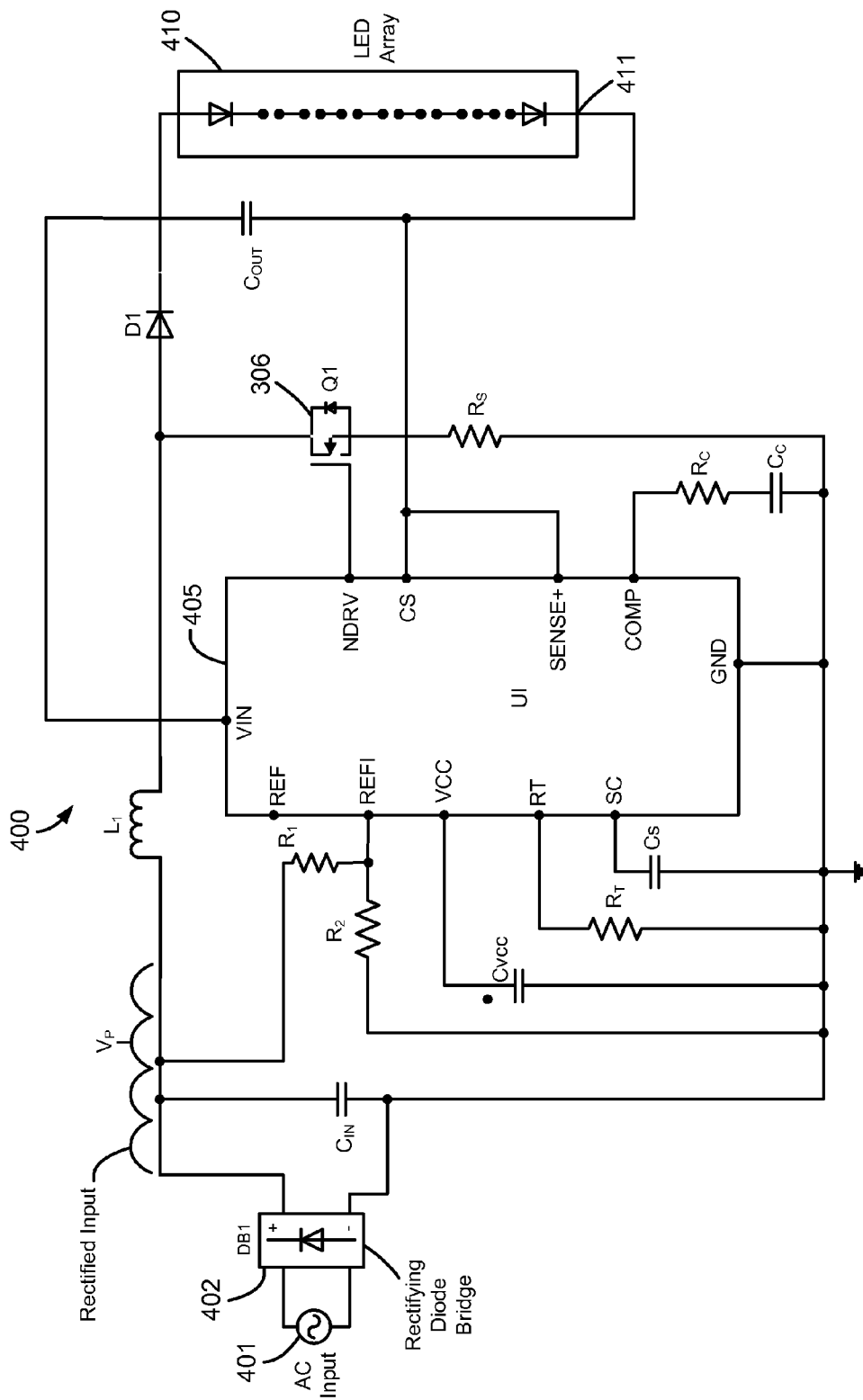
FIG. 4 illustrates a circuit diagram of an embodiment of the present invention where a boost LED driver circuit is designed for power factor correction (PFC) for an AC input.

FIG. 4 illustrates an embodiment of the present invention where a boost LED drive circuit 400 is designed for PFC for AC input applications. In this embodiment, the main power source 401 is an AC power source. The AC input current is rectified employing a rectifier bridge DB1 at 402. It will be understood by those skilled in the art that the employment of a rectifier bridge 402 in relation to AC currents provides a rectified input comprising a positive-half sine waveform having a peak voltage, $V_P$. The output of the rectifier bridge DB1 is provided to inductor $L_1$. An inductor L2 is added for EMI filtering immediately after the rectifier bridge 402 to keep the switching currents in the loop formed by $L_1$ and $C_{IN}$. Capacitor $C_{IN}$ is placed after the inductor L2 to smooth out any signal ripples in the signal.

In this embodiment, the rectified voltage from rectifier bridge DB1 is a rectified sine wave voltage as long as the input to rectifier bridge DB1 is an AC sine waveform. The SENSE+ pin and the CS pin of LED driver 405 are connected to cathode 411 of LED array 410. The connection for the output capacitor $C_{OUT}$ and the cathode 411 of LED array 410 is implemented as shown in FIG. 4. The capacitor $C_{OUT}$ and cathode 411 of LED array 410 are connected to the source of switching MOSFET Q1. When connected in this manner, the current in the resistor $R_s$ follows the current in the inductor L1.

In the FIG. 4 embodiment, the programmable REFI pin is connected to a resistor divider, $R_1$ and $R_2$, from rectified AC input 401. This programs the input current to LED driver 405 to be proportional to the input voltage derived at rectifier bridge DB1. If the ratio of the voltage on the REFI pin to the voltage of the CS pin is denoted as G, the input current, $I_{IN}$, is given by the following equation (1):

$$I_{IN} \times R_S \times G = \frac{V_{IN} \times R_2}{(R_1 + R_2)} \quad (1)$$

In the above equation, $V_{IN}$ is the input voltage at the rectifier bridge DB1. Note that any drops in the diode bridge are negligible and, therefore, have been neglected in the above equation (1). The power drawn from the input current to the LED driver 405 and, hence, the power available at the LED array is controlled by LED driver 405. The equivalent resistance appearing at the input of the LED driver 405 is given by resistance, $R_{eq}$, via the following equation (2):

$$R_{eq} = \frac{(R_1 + R_2) \times R_s \times G}{R_2} \quad (2)$$

The circuit described may be employed for applications where the total voltage drop across the LED array exceeds the peak voltage at the circuit input.

The embodiment of the boost LED driver circuit as illustrated in FIG. 4 above is particularly useful in lighting applications where the total voltage drop across the LED array is greater, or is required to be greater, than the peak of the input voltage. However, an embodiment described in FIG. 5 below may be employed in lighting applications where the voltage across the LED array is or may be lower than the peak of the input voltage.

Figure 5:
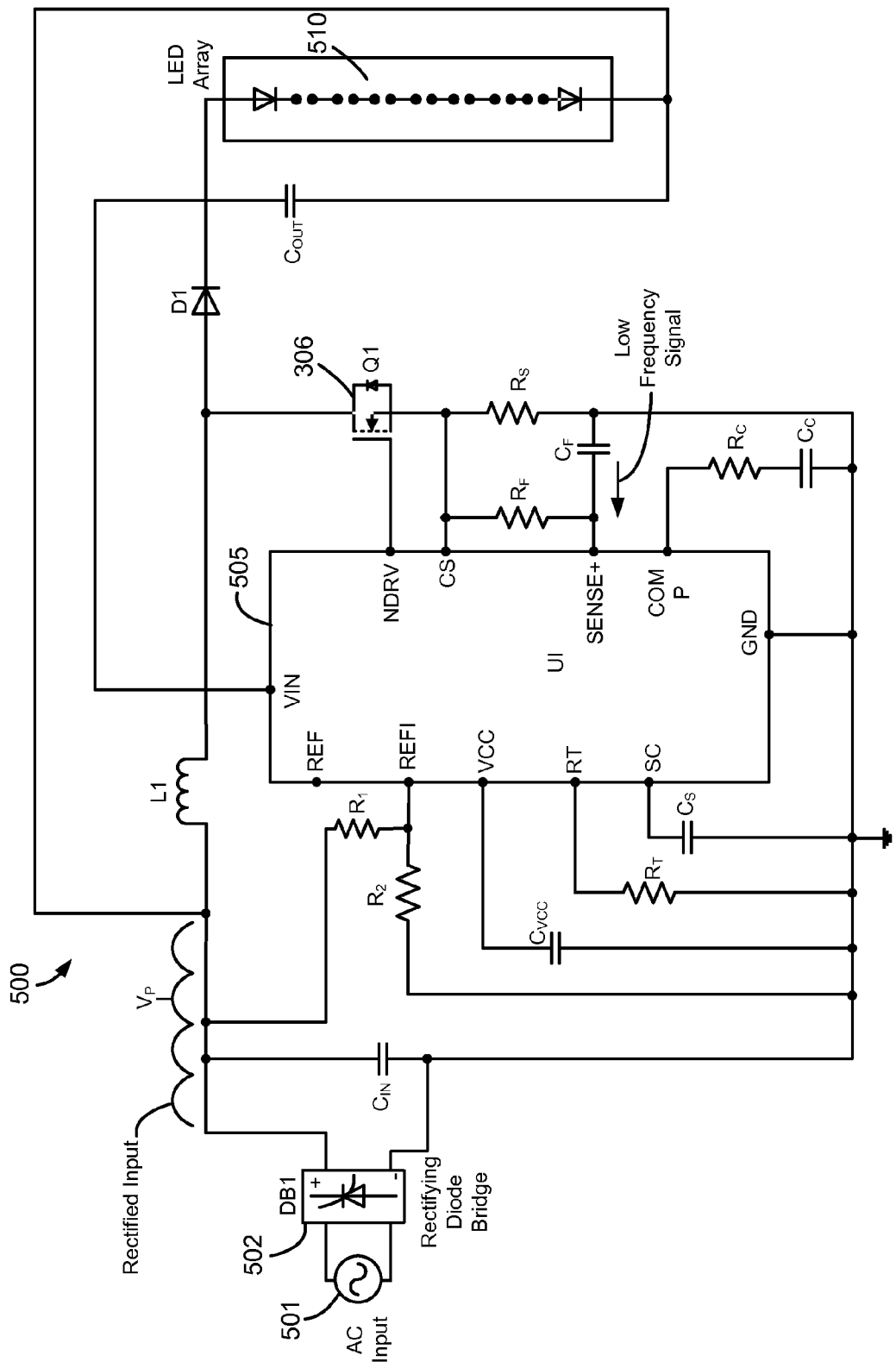
FIG. 5 illustrates a circuit diagram of an embodiment of a buck-boost type of LED driver with power factor correction (PFC)

FIG. 5 illustrates an embodiment of a buck-boost type of LED driver circuit 500 with PFC. Here, the pulsating current flowing in switching MOSFET Q1 that was previously employed by the inner peak current mode control loop, described in FIG. 3, is also employed by the outer current input control loop. The current flowing in the MOSFET Q1 pulsates at the switching frequency set by resistor $R_T$. AC input 501 to bridge 502 is normally at a lower frequency, below that of an internal switching frequency capable of device 306.

In FIG. 5, the resistor $R_f$ and capacitor $C_f$ form an RC filter circuit to filter out high frequency components in the voltage across the switch current sense-resistor $R_S$. This low frequency signal is then fed to LED driver 505 through the SENSE+ pin. The outer control loop of LED driver 505 controls the voltage appearing on the SENSE+ pin so that it is proportional to the voltage on the programmable REFI pin. Thus, the voltage on the SENSE+ pin will now be proportional to the input current to LED driver 505. Since the voltage at the REFI pin is proportional to the input voltage to driver 505, the input current is proportional to the input voltage. In this manner, circuit 500 of FIG. 5 provides one embodiment of achieving PFC for LED drivers where the voltage across LED array 510 is lower than the peak of the input voltage.

Figure 6:
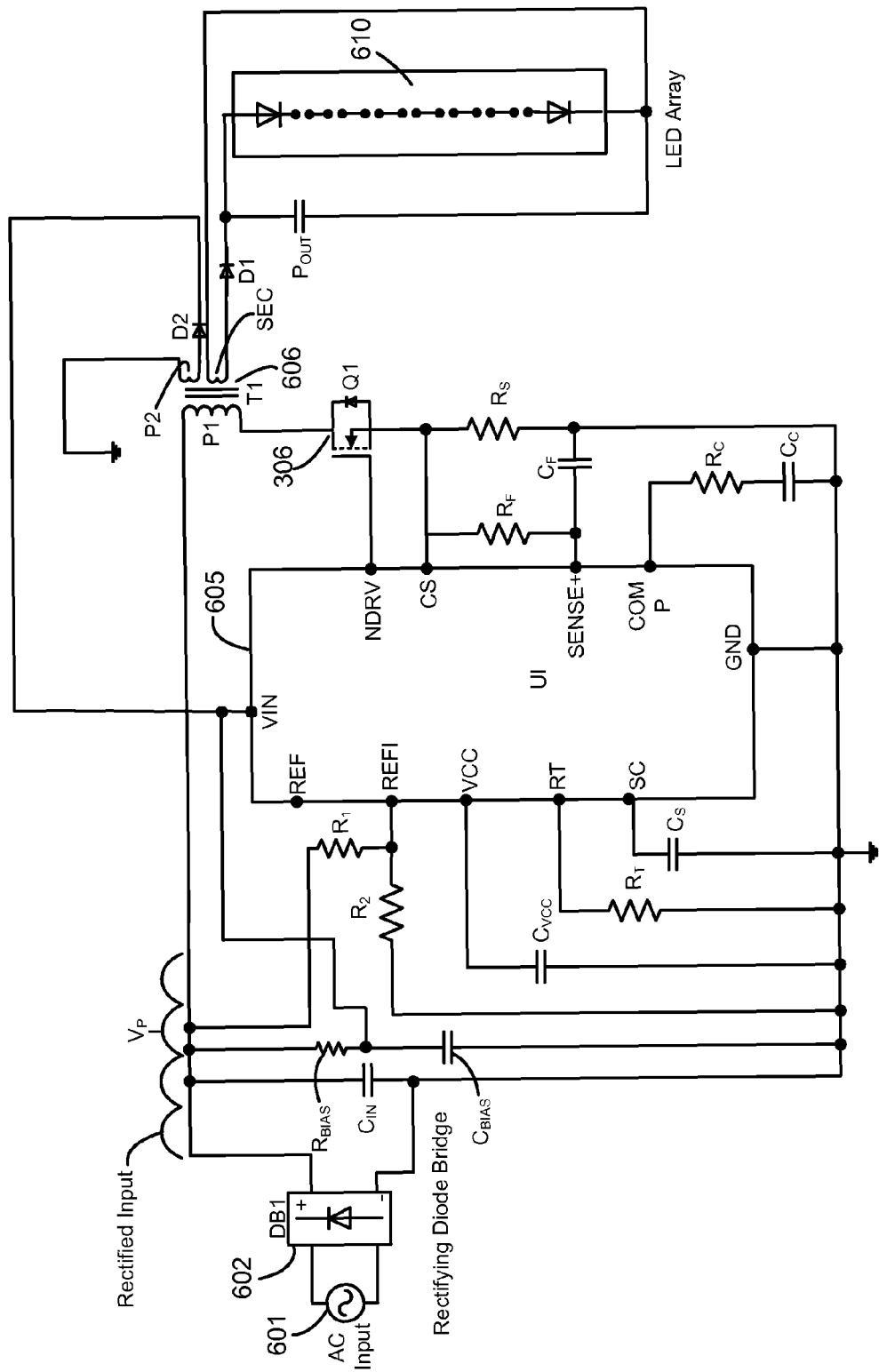
FIG. 6 illustrates a circuit diagram of an embodiment of the present invention providing isolation between an AC input and the LED array by using a transformer setup.

The embodiment illustrated in FIG. 5 may also be employed in offline LED driver circuits that require isolation between AC input and the LED array, e.g., between power source 101 and LED array 110 in FIG. 1. In such a case, a transformer is employed to achieve the requisite isolation between these two circuits, and the rectified secondary voltage is employed to power the LED array. FIG. 6 discussed below presents an embodiment of achieving a PFC LED driver circuit with isolation from the AC input.

FIG. 6 illustrates an embodiment of the present invention providing isolation between the AC input 601, via bridge 602, and the LED array 610 by employing a transformer setup T1 in the driver circuit output at 606 to the input of LED array 610. In this embodiment, the resistor $R_{BIAS}$ and capacitor $C_{BIAS}$ provide the initial startup voltage to power LED driver 605. However, as soon as LED driver circuit 605, together with switching MOSFET Q1, commences the switching function, the transformer winding, P2, provides a bootstrapped voltage to power control LED driver 605 via VIN. There is no isolation between windings P1 and P2. The secondary winding SEC coupled to array 610 is isolated from both windings P1 and P2 of transformer T1. In some cases, the power required to power the control driver circuit can be constantly powered from the circuit comprised of Rbias and Cbias or some other circuit which can then eliminate the winding P2.

In the embodiments illustrated with reference to the AC inputs, as illustrated in FIGS. 4-6, the input current to the LED array is not regulated at a DC current level. The input current to the LED array may look more like a rectified sinusoid if the original AC input waveform is sinusoidal. If the AC input has a frequency f, the current through the LED array will have a rectified sinusoidal waveform with a frequency 2f.

Prior art approaches supply a DC current to control the current in the LED array, and require a large capacitor across the LED load to effectuate the delivery. However, in the present invention, a pulsating current is applied and the LED driver circuit appears as substantially resistive load. Therefore, a capacitor, $C_{OUT}$, of minimal value is employed across the LED array load. This enables an external voltage to be employed to increase or decrease the magnitude of current provided through the LED array and, consequently, varying the light output of the LED array. In one embodiment, the external voltage supplied by an analog dimmer that is normally employed for conventional lighting devices, e.g., halogen lamps, other filament based lamps, etc., is employed to control the light output of the LED array.

Thus, various embodiments of the invention are now illustrated to provide a LED driver circuit that may be integrated within lighting systems utilizing an electronic transformer and dimming functionality. For example, embodiments of the present invention may be used to retrofit existing halogen lamp systems with LEDs. The integration of a fixed frequency averaged current mode controlled LED driver within legacy lighting systems allows these lighting systems that had traditionally delivered approximately 20 W to 50 W to a halogen lamp be modified so that approximately 5-15 W is delivered to an LED device. However, in certain instances such as retrofitting MR16 halogen systems with LEDs, the MR16 driver may have compatibility issues with the pre-installed electric transformers.

The characteristics of electronic transformers change from vendor to vendor. One such characteristic is the minimum current required within the transformer for operation. As previously discussed, the current through a prior art MR16 driver is a square wave having an average current and peak current. Embodiments of the present invention provide a current waveform shaping element that provides an equivalent average current drawn through the transformer but improves the peak current.

FIG. 7A illustrates an exemplary MR16 LED driver that is compatible with pre-existing electronic transformers. As shown a high voltage AC signal (e.g., 120V or 240V) is input into electric transformer 730 which outputs a low voltage AC signal (e.g., 12V). The low voltage AC signal is provided to a MR16 LED driver 750 that converts the AC signal into a DC signal and delivers a preferred power level to the LEDs 760.

In certain embodiments, a current waveform shaper 740 is provided on the positive input of the MR16 LED driver 750 that pulls relatively higher peak current every switching cycle through the electric transformer 730. The current waveform shaper 740 may be a single electric component, such as an inductor, or a more complicated shaping element. In some embodiments, the current waveform shaper 740 is positioned between the electric transformer 730 and a rectifier bridge within the LED driver 750 that converts the AC signal into a DC rectified signal.

FIG. 7B illustrates a MR16 LED system according to various embodiments of the invention. As shown in the figure, a current waveform shaper 770 is positioned on the negative input of the MR16 LED driver 750.

Figure 8:
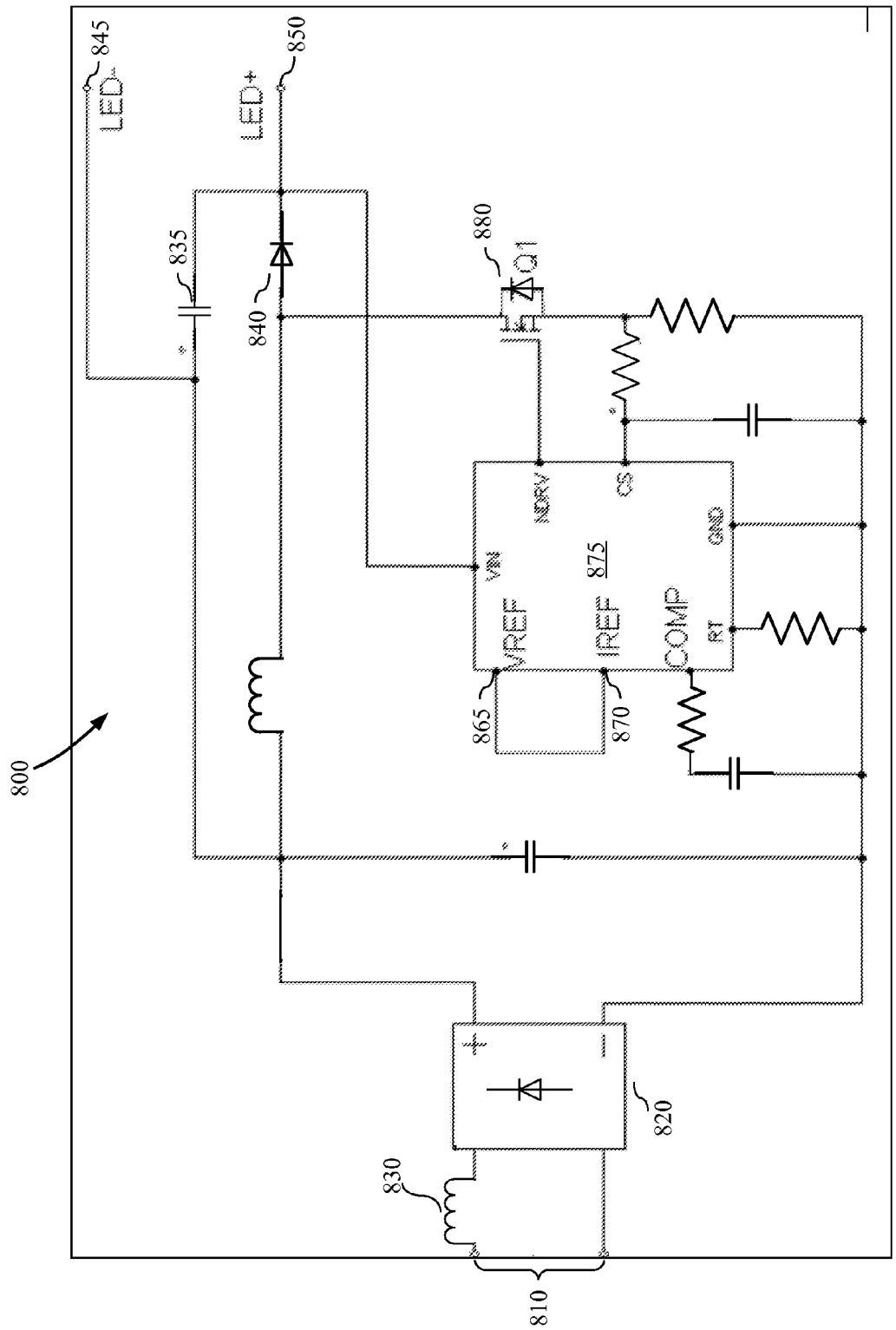
FIG. 8 is a general diagram of a general MR16 LED driver according to various embodiments of the invention.

FIG. 8 illustrates a first driver circuit 800 of an averaged current mode controlled M16 LED driver according to various embodiments of the invention. As shown in FIG. 8, AC signal 810 is received by bridge rectifier 820 and converted to a DC signal. A filter may be included at the output of rectifier 820 which removes switching frequency noise from the DC output of bridge rectifier 820.

Control circuitry 875 controls current drawn from the positive terminal of the diode bridge and defines the amount of power to be delivered across LED − and + nodes 845, 850 connected across an LED load. Control circuitry 875 controls this current by analyzing the output from filter relative to one or more internally provided reference currents or voltages. In this particular case, a voltage reference (VREF) 865 and a current reference (IREF) 870 are provided by circuit 875. In response to this analysis, a switch 880 is controlled by control circuitry 865 to control the amount of current drawn from the filter.

A smoothing capacitor 835 is also provided across LED nodes 845, 850 to smooth the signal provided to the nodes.

Figure 9:
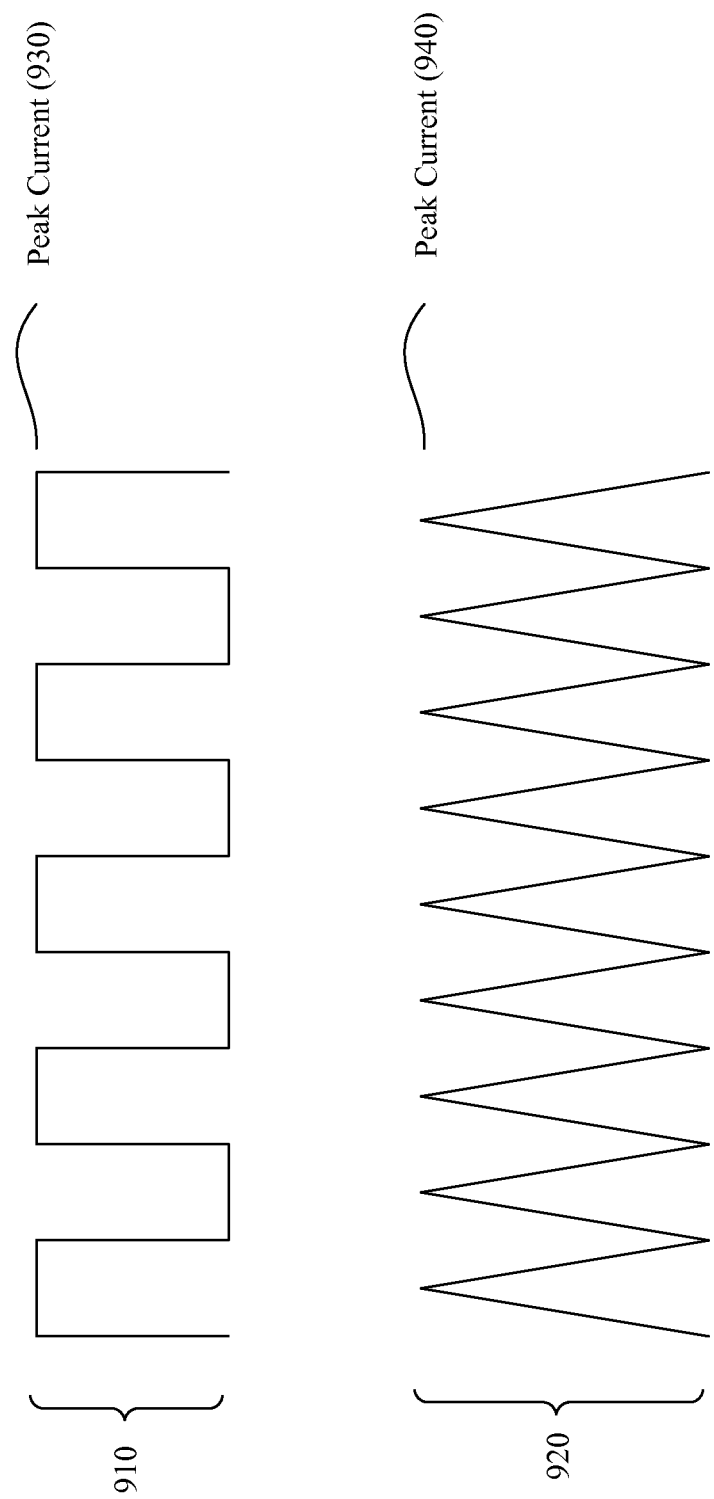
FIG. 9 illustrates current waveforms showing waveform shaping according to various embodiments of the invention.

An inductor 830 is positioned on the input of rectifier 820 that shapes the waveform of the current drawn from an electric transformer generating AC signal 810. In the case of the inductor 830, the current drawn from the electric transformer is adjusted to improve the performance of the transformer. For purposes of illustration, FIG. 9 shows a current waveform present without the inductor 830 and a current waveform resulting from the inductor 830.

A first current waveform 910 is shown that is generated from an electric transformer without the presence of a current waveform shaper such as the inductor. The first current waveform 910 has an average current and a first peak current 930. Comparatively, a second current waveform 920 is shown that results from the inductor 830 positioned between the electric transformer and the rectifier 820. The second current waveform 920 has the same average current but has a second peak current 940 that is larger than the first peak current 930.

As a result of the second current waveform being drawn through the electric transformer, the compatibility of the M16 LED driver to the electric transformer is improved because the current level remains above the turn-off current threshold for a longer period of time.

One skilled in the art will recognize that other components and functionality may be inserted within the specific examples shown in the figures. Additionally, these examples may be modified to handle different power characteristics of LEDs, LED strings as well as electronic transformers and dimmers.

It will be appreciated to those skilled in the art that the preceding examples and embodiments are exemplary and are for purposes of clarity and understanding and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It is, therefore, intended that the following appended claims include all such modifications, permutation and equivalents as fall within the true spirit and scope of the present invention.

What is claimed is:

1. A solid state lighting control system that provide power factor correction, the system comprising:
   a current waveform shaper coupled to receive an AC power signal, the current waveform adjusts a peak current on the AC power signal;
   a bridge rectifier coupled to receive an adjusted AC power signal, the bridge rectifier converts the adjusted AC power signal to a DC power signal;
   an LED driver coupled to receive the DC power signal and to generate a regulated LED power signal, the LED driver is controlled to provide power factor correction on the regulated LED power signal;
   a control circuit coupled to the LED driver, the control circuit comprising at least one switching device that enables an current at a particular frequency to be applied to an LED array independent of the power signal received at the bridge rectifier; and
   an inner control loop within the LED driver that controls a duty cycle of a switching device; and an outer control loop that controls the regulated LED power signal using an error amplifier,
   wherein the LED driver measures a current level on the AC power signal and controls the regulated LED power signal such that the power signal and the regulated LED power signal are in phase.

2. The system of claim 1 wherein a current level on the regulated LED power signal is controlled using a detected external voltage.

3. The system of claim 1 wherein the LED driver is configured as a direct current boost driver using a fixed frequency peak current mode control.

4. The system of claim 1 wherein the current waveform shaper modifies a square wave current to a triangle wave current, resulting in a higher peak current.

5. The system of claim 1 wherein a current magnitude of the regulated LED power signal is adjustable by controlling a programmable reference pin on the LED driver.

6. The system of claim 1 wherein the LED driver is configured as an alternating current boost driver.

7. The system of claim 6 further comprising at least one inductor and one capacitor coupled between the rectifier bridge and the LED driver, the at least one inductor and one capacitor shaping the power signal prior to being received at first interface.

8. The system of claim 7 wherein a current level on the power signal is controlled to be proportional to an input voltage derived at the rectifier bridge.

9. The system of claim 1 wherein the LED driver is configured as a buck-boost driver.

10. The system of claim 9 wherein a pulsating current flowing in a switching MOSFET within the LED driver is used by an inner peak control loop and an outer current control loop to control the regulated LED power signal.

11. The system of claim 9 wherein the LED driver is employed in an offline configuration to isolate an AC input on the LED driver and an LED array.

12. A method for providing power factor correction on a regulated LED power signal, the method comprising:
receiving an alternating current power signal from an electronic transformer; shaping the power signal such that a peak current is pulled through the electronic transformer every switching cycle;
converting the alternating current power signal into a rectified direct current power signal;
controlling a switch within a driver by comparing the rectified direct current power signal to at least one reference within the driver, the switch generates a regulated LED power signal from the rectified direct current power signal, wherein an inner control loop controls a duty cycle of the switch and wherein the regulated LED power signal is regulated by an outer control loop that comprises an error amplifier; and
smoothing the regulated LED power signal to remove at least a portion of noise on the regulated LED power signal from the switch.

13. The method of claim 12 further comprising the step of filtering the rectified direct current power signal to remove at least a portion of switching noise from a bridge rectifier.

14. The method of claim 12 wherein the at least one reference within the driver is a current reference.

15. The method of claim 12 wherein the at least one reference within the driver is a voltage reference.

16. An apparatus comprising:
a current waveform shaper coupled to receive an AC power signal, the current waveform shaper adjusts a peak current on the AC power signal a bridge rectifier coupled to receive an adjusted AC power signal, the bridge rectifier converts the adjusted AC power signal to a DC power signal;
a fixed frequency average current mode control (FFACMC) circuit coupled to receive the DC power signal;
a programmable reference in the circuit;
the FFACMC controlling a switch relative to a voltage on an input signal and is programmable such that a voltage drop on the input signal relative to a reference voltage results in a power factor correction (PFC) applied to an output voltage of the circuit; and
an inner control loop within an LED driver that controls a duty cycle of a switching device; and an outer control loop that controls a regulated LED power signal using an error amplifier.

17. The apparatus of claim 16 wherein the output voltage is maintained in phase with the input signal so that the circuit appears as a resistive load across an input interface.

18. The apparatus of claim 16 wherein the output voltage of the circuit is applied across a solid state lighting (SSL) device.

19. The apparatus of claim 16 further comprises a fixed frequency averaged current mode controlled LED driver that allows a halogen lighting system to support a LED lighting system.

20. The apparatus of claim 16 wherein the current waveform shaper modifies a square wave current to a triangle wave current, resulting in a higher peak current.

* * * * *